(12) United States Patent
Dahiya et al.

(10) Patent No.: US 9,661,521 B2
(45) Date of Patent: May 23, 2017

(54) INTERRUPT HANDLING SYSTEM FOR CELLULAR COMMUNICATION NETWORK

(71) Applicants: Somvir Dahiya, Ghaziabad (IN); Rajan Kapoor, Faridabad (IN); Arvind Kaushik, Ghaziabad (IN)

(72) Inventors: Somvir Dahiya, Ghaziabad (IN); Rajan Kapoor, Faridabad (IN); Arvind Kaushik, Ghaziabad (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 287 days.

(21) Appl. No.: 14/591,926

(22) Filed: Jan. 8, 2015

(65) Prior Publication Data

US 2016/0205583 A1 Jul. 14, 2016

(51) Int. Cl.
H04B 1/16 (2006.01)
H04W 28/02 (2009.01)
G06F 13/24 (2006.01)
H04J 3/06 (2006.01)

(52) U.S. Cl.
CPC ........ *H04W 28/0205* (2013.01); *G06F 13/24* (2013.01); *H04B 1/16* (2013.01); *H04W 28/0278* (2013.01); *H04J 3/0685* (2013.01)

(58) Field of Classification Search
CPC ............ H04W 28/0205; H04L 3/06885
USPC ............................. 370/350, 351, 352
See application file for complete search history.

(56) References Cited

U.S. PATENT DOCUMENTS

| | | | |
|---|---|---|---|
| 4,604,500 A | 8/1986 | Brown | |
| 5,519,603 A | 5/1996 | Allbery | |
| 6,442,634 B2 | 8/2002 | Bronson | |
| 6,718,370 B1 | 4/2004 | Coffman | |
| 6,988,156 B2 | 1/2006 | Musumeci | |
| 7,103,887 B2 | 9/2006 | Shavit | |
| 8,259,576 B2 | 9/2012 | Lee | |
| 8,417,862 B2 | 4/2013 | Talamacki | |
| 2008/0278740 A1* | 11/2008 | Bird | G06Q 10/10 358/1.15 |
| 2009/0252219 A1* | 10/2009 | Chen | H04L 12/5693 375/240.02 |

* cited by examiner

*Primary Examiner* — Dang Ton
(74) *Attorney, Agent, or Firm* — Charles E. Bergere

(57) ABSTRACT

A system for merging first and second interrupts includes first and second queue modules, first and second status modules, and first and second merger modules. The first and second queue modules receive first and second en-queue signals corresponding to the first and second interrupts, first and second de-queue signals, and generate first and second status signals. The first and second status modules receive first and second status signals, and first and second output signals, and generate first and second merge signals. The first and second merger modules receive the first and second merge signals, and generate the first and second output signals. One of the first and second output signals is indicative of the first and second en-queue signals, thereby merging the first and second interrupts into at least one of the first and second output signals.

20 Claims, 7 Drawing Sheets

INTERRUPT HANDLING SYSTEM FOR CELLULAR COMMUNICATION NETWORK

BACKGROUND OF THE INVENTION

The present invention relates generally to communication networks, and, more particularly, a system for handling interrupts in a cellular communication network.

A cellular communication network includes multiple mobile switching centers (MSCs), home location registers (HLRs), base station controllers (BSCs), base transceiver stations (BTSs), and user equipment (UE). Some of the terms used herein, such as MSC, BSC, BTS, and UE, are technology standard specific and in this case are used in the Global System for Mobile communication (GSM) standard of wireless communication. The BTS in the GSM standard corresponds to Node-B in the third generation (3G) and eNode-B in the fourth generation (4G) wireless communication standards. Each BTS includes radio-frequency integrated circuits (RFICs) and a baseband processor.

Coverage areas of cellular communication network are divided into multiple cells. A cell represents a geographical area served by a single BTS. Cells are split into multiple sectors in order to increase efficiency. In such cases, a separate antenna is used to serve each sector of the cell and hence, multiple antennas are used for such cells. Each antenna is connected to an RFIC, and each RFIC is connected to the baseband processor. Thus, for a BTS having multiple antennas, multiple RFICs are connected to the baseband processor.

Each antenna receives data over multiple radio-frequency (RF) channels. The data is sent to the RFIC connected to the antenna. The RFIC receives the data, generates an interrupt based on the data received, and then provides the interrupt to the baseband processor, where it is received and serviced. The interrupts may be of various types, such as interrupts for data transfer, interrupts for cell handover, interrupts for call setup and tear down, and direct memory access (DMA) interrupts.

Further, in a BTS, multiple radio interfaces may be used for data transfer between multiple UEs. Each radio interface may include multiple streams of data. In such cases, the RFIC generates a separate interrupt for each radio interface or for each stream of data. Thus, multiple interrupts are transmitted to the baseband processor. In another example, for data transfer over large bandwidths, multiple RFICs are required to cater to the data transfer in a sector. Thus, each RFIC generates an interrupt and hence, the baseband processor receives multiple interrupts for the sector.

Since the baseband processor receives multiple interrupts, it is essential for the baseband processor to keep track of and synchronize them. The baseband processor services the interrupts individually as they arrive and requires many software computations for servicing the interrupts. For periodic interrupts that are received frequently, the software computations involved in servicing, tracking and synchronizing the interrupts are very large, which impacts the ability of the baseband processor to continually, quickly service all of the interrupts.

One known technique to assist the baseband processor in servicing interrupts uses software executed by the baseband processor for merging the interrupts. However, since most of the interrupts are periodic and have a short time period, i.e., the interrupts are generated frequently, the interrupt count increases. Hence, the software overhead associated with merging the interrupts is high. Since the interrupts are real-time and periodic, the software must synchronize multiple instances of the interrupts before merging them and hence, the complexity of the computations to merge the interrupts is high. Hence, merging of the interrupts by the software consumes enormous resources of the baseband processor.

Therefore it would be advantageous to have a system for merging interrupts without such high software overhead and which improves the performance of the baseband processor.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
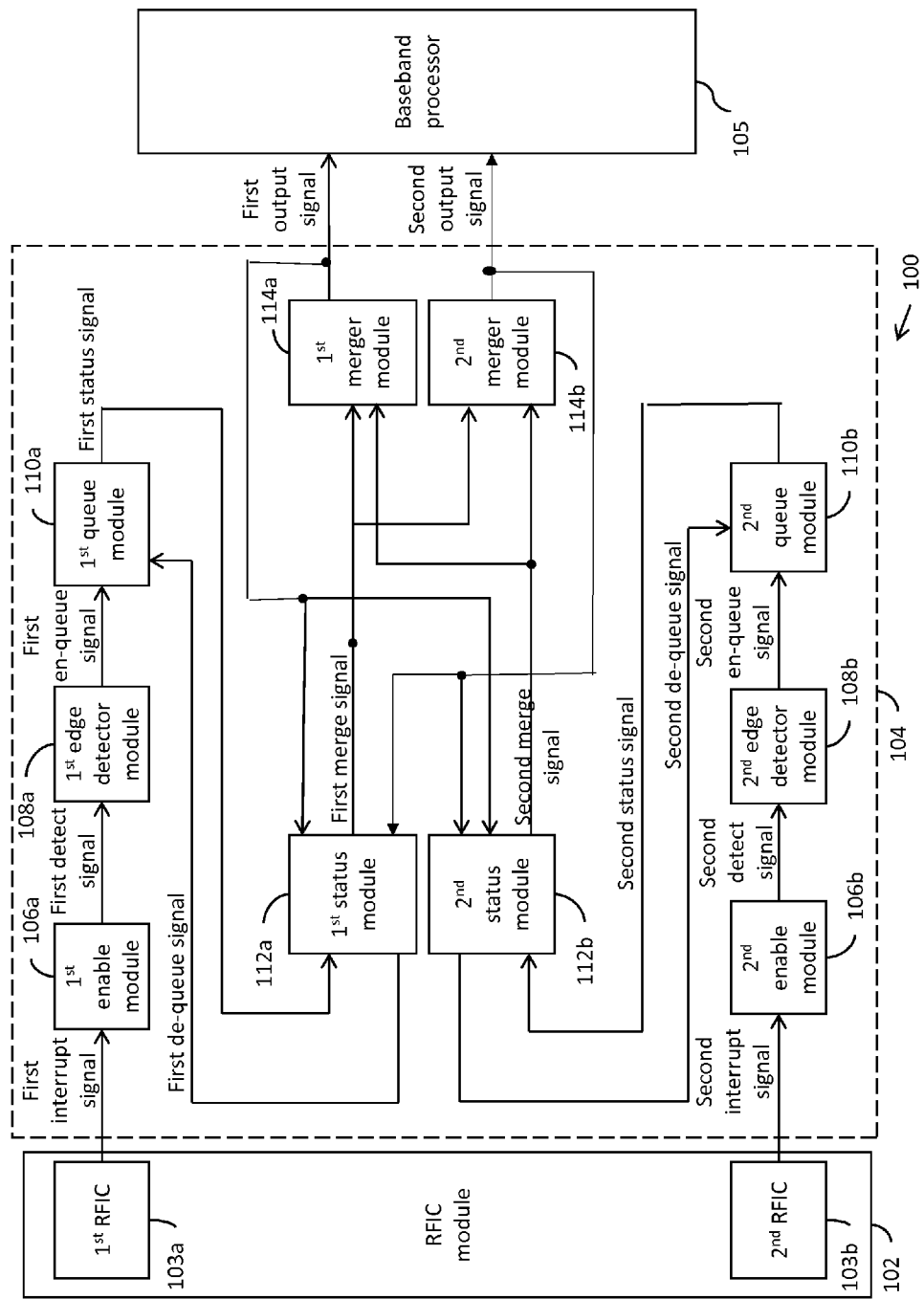
FIG. 1 is a schematic block diagram of a system for merging interrupts generated by a radio-frequency integrated circuit (RFIC) module in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. As used herein, the terms multiplexer and mux are used interchangeably.

In an embodiment of the present invention, a system for merging first and second en-queue signals corresponding to first and second interrupts is provided. The system includes first and second queue modules, first and second status modules, and first and second merger modules. The first queue module receives and stores the first en-queue signal, receives a first de-queue signal, and generates a first status signal based on the first en-queue signal and the first de-queue signal. The first status module receives first and second output signals and the first status signal, identifies one of the first and second output signals as a first final output signal, and generates a first merge signal and the first de-queue signal based on the first final output signal and the first status signal. The second queue module receives and stores the second en-queue signal, receives a second de-queue signal, and generates a second status signal based on the second en-queue signal and the second de-queue signal. The second status module receives the first and second output signals and the second status signal, identifies one of the first and second output signals as a second final output signal, and generates a second merge signal and the second de-queue signal based on the second final output signal and the second status signal. The first merger module receives the first and second merge signals, stores a first merger value that includes first and second values corresponding to the first and second interrupts, and generates the first output signal based on the first merger value and the first and second merge signals. The second merger module receives the first and second merge signals, stores a second merger value that includes third and fourth values corresponding to the first and second interrupts, respectively, and generates the second output signal based on the second merger value and the first and second merge signals. At least one of the first and second output signals is indicative of the first and second en-queue signals, thereby merging the first and second en-queue signals in to at least one of the first and second output signals.

In another embodiment of the present invention, a wireless communication system is provided. The wireless communication system includes a radio-frequency integrated circuit (RFIC) module, first and second edge detector modules, the system for merging first and second en-queue signals corresponding to first and second interrupts, and a baseband processor. The RFIC module receives first and second RF signals and generates first and second interrupt signals corresponding to the first and second interrupts, respectively. The first enable module receives the first interrupt signal, stores a first enable value indicative of one of enable and disable status of the first interrupt, determines whether the first interrupt is enabled or disabled based on the first enable value, and generates a first detect signal based on the first interrupt signal if the first interrupt is enabled. The first edge detector module receives the first detect signal and generates the first en-queue signal based on one of a rising and a falling edge of the first detect signal. The second enable module receives the second interrupt signal, stores a second enable value indicative of one of enable and disable status of the second interrupt, determines whether the second interrupt is enabled or disabled based on the second enable value, and generates a second detect signal based on the second interrupt signal if the second interrupt is enabled. The second edge detector module receives the second detect signal and generates the second en-queue signal based on one of a rising and a falling edge of the second detect signal. The system for merging receives the first and second en-queue signals and merges the first and second interrupts into at least one of the first and second output signals, and the baseband processor receives and services the first and second output signals.

Various embodiments of the present invention provide a wireless communication system for merging first and second en-queue signals corresponding to first and second interrupts, respectively.

The wireless communication system can be extended for combining a plurality of interrupts into a plurality of output signals. The wireless communication system enables merging a first set of interrupts of the plurality of interrupts into the first output signal, and a second set of interrupts of the plurality of interrupts into the second output signal. Further, the wireless communication system merges the first and second interrupts using hardware modules and hence, the software overhead incurred in merging the interrupts is reduced, thereby reducing the usage of the baseband processor resources, which results in improved performance of the baseband processor.

Referring now to FIG. 1, a schematic block diagram of a system 100 for merging first and second interrupts in accordance with an embodiment of the present invention is shown. The system 100 includes a radio-frequency integrated circuit (RFIC) module 102, which includes a plurality of RFICs 103 including first and second RFICs 103*a* and 103*b*. The system 100 further includes a merging system 104 and a baseband processor 105. The first and second RFICs 103*a* and 103*b* are connected to multiple antennas for receiving multiple radio-frequency (RF) signals. Each RFIC 103 receives an RF signal from an antenna and generates an interrupt signal. In one embodiment, the RFIC module 102 may include a single RFIC 103 that receives multiple RF signals and generates corresponding interrupt signals.

In an embodiment of the present invention, the system 100 is included in a base transceiver station (BTS) (not shown). The BTS further includes the multiple antennas (not shown). The BTS is a part of a cellular communication network servicing multiple user equipments (UEs). In one example, first and second antennas are connected to the first and second RFICs 103*a* and 103*b*, respectively. The first and second antennas receive first and second RF signals over first and second RF communication channels, respectively. The first and second antennas transmit the first and second RF signals to the first and second RFICs 103*a* and 103*b*, respectively. The first and second RFICs 103*a* and 103*b* generate first and second interrupt signals based on the first and second RF signals, respectively.

The merging system 104 is a multi-stage processing unit that receives the interrupts generated by the RFIC module 102 and merges the interrupts into output signals, i.e., the merging system 104 implements a multi-stage process for merging the interrupts. The merging system 104 includes separate hardware modules for each stage of the multi-stage process. Further, the merging system 104 includes separate hardware modules for each interrupt received. Thus, each interrupt has a dedicated hardware module at each stage of the multi-stage process. The hardware modules include enable modules, edge detector modules, queue modules, status modules, and merger modules. Hence, the number of hardware modules included in each stage of the multi-stage process depends on the number of interrupts received by the merging system 104.

In one example, the merging system 104 receives and merges two interrupts—first and second interrupts. Therefore, the merging system 104 includes two hardware modules at each stage. The hardware modules included in the merging system 104 for merging the two interrupts include first and second enable modules 106*a* and 106*b*, first and second edge detector modules 108*a* and 108*b*, first and second queue modules 110*a* and 110*b*, first and second status modules 112*a* and 112*b*, and first and second merger modules 114*a* and 114*b*.

The first and second RFICs 103*a* and 103*b* generate the first and second interrupt signals corresponding to the first and second interrupts, respectively. The merging system 104 receives and merges the first and second interrupt signals into one of first and second output signals. In another example, the merging system 104 receives multiple interrupts and merges a first set of interrupts into the first output signal and a second set of interrupts into the second output signal. The system is capable of handling interrupts that are real-time and periodic in nature.

The baseband processor 105 is connected to the merging system 104 for receiving the first and second output signals. The baseband processor 105 services the first and second output signals. In one example, the baseband processor 105 is a baseband radio processor. The baseband processor 105 performs processing required for multiple radio functions such as signal modulation and encoding. In another example, the baseband processor 105 includes an internal memory (not shown). In another example, the baseband processor 105 services the first set of interrupts corresponding to the first output signal after receiving the first output signal and services the second set of interrupts corresponding to the second output signal after receiving the second output signal.

The first and second enable modules 106a and 106b are connected to the first and second RFICs 103a and 103b, respectively, for receiving the first and second interrupt signals, respectively. The interrupts vary in importance and priorities. In one example, an interrupt having a low-priority is masked. Such masked interrupts are referred to as disabled. In another example, another interrupt having high-priority is un-masked. Such un-masked interrupts are referred to as enabled.

The first and second enable modules 106a and 106b determine whether the first and second interrupts are enabled or disabled, respectively. The first enable module 106a stores a first enable value indicative of enable or disable status of the first interrupt, receives the first interrupt signal, determines whether the first interrupt is enabled or disabled based on the first enable value, and generates a first detect signal based on the first interrupt signal if the first interrupt is enabled. Similarly, the second enable module 106b stores a second enable value indicative of enable or disable status of the second interrupt, receives the second interrupt signal, determines whether the second interrupt is enabled or disabled based on the second enable value, and generates a second detect signal based on the second interrupt signal if the second interrupt is enabled. Hence, the first and second detect signals are generated only when the first and second interrupts are un-masked, respectively, thereby merging the enabled first and second interrupts. In one example, the first enable value 106a generates the first detect signal when the first enable value is at logic high state. Similarly, the second enable module 106b generates the second detect signal when the second enable value is at logic high state. In this example, the first and second enable values are true if they are at a logic high state. In another example, an external processor (not shown) stores the first and second enable values in the first and second enable modules 106a and 106b, respectively. In another example, the baseband processor 105 stores the first and second enable values in the first and second enable modules 106a and 106b, respectively. In one embodiment, the first and second enable modules 106a and 106b include internal registers (not shown) that store the first and second enable values.

The first and second edge detector modules 108a and 108b are connected to the first and second enable modules 106a and 106b for receiving the first and second detect signals, respectively. The interrupts may be edge-triggered interrupts, level-triggered interrupts, or hybrid interrupts. The edge-triggered interrupts include positive and negative edge-triggered interrupts. The first edge detector module 108a receives the first detect signal and generates a first en-queue signal based on one of rising and falling edges of the first detect signal. The second edge detector module 108b receives the second detect signal and generates a second en-queue signal based on one of the rising and falling edges of the second detect signal. The first and second en-queue signals en-queue the first and second interrupts, respectively, for merging.

The first queue module 110a is connected between the first edge detector module 108a and the first status module 112a. The first queue module 110a receives and stores the first en-queue signal, receives a first de-queue signal, and generates a first status signal based on the first en-queue and first de-queue signals.

Figure 2:
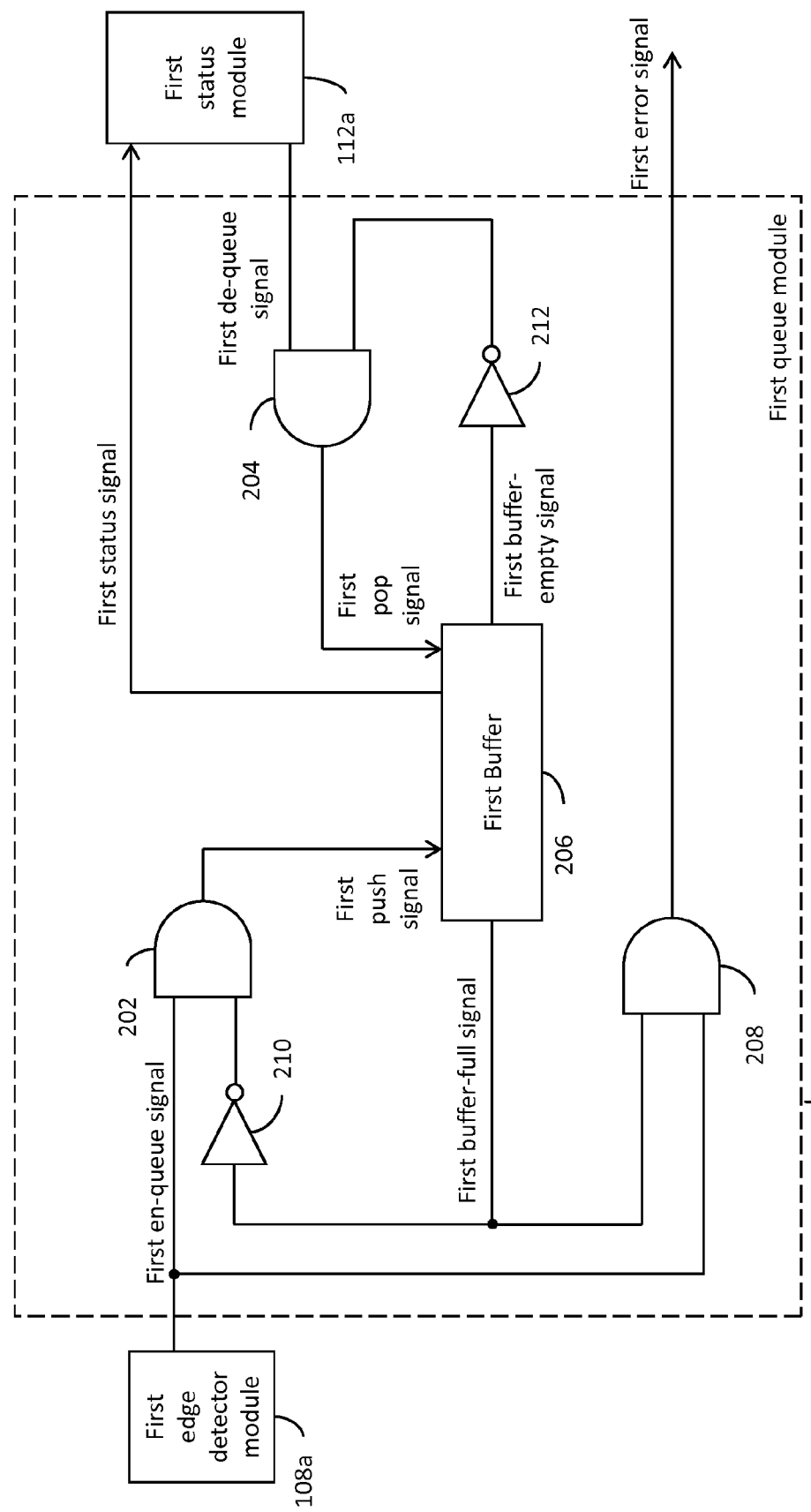
FIG. 2 is a schematic block diagram of a first queue module in accordance with an embodiment of the present invention.

Referring now to FIG. 2, a schematic block diagram of the first queue module 110a in accordance with an embodiment of the present invention is shown. The first queue module 110a includes a first AND gate 202, a second AND gate 204, a first buffer 206, a third AND gate 208, and first and second inverters 210 and 212.

The first AND gate 202 has a first input terminal connected to the first edge detector module 108a for receiving the first en-queue signal, a second input terminal for receiving an inverted version of the first buffer-full signal by way of the first inverter 210, and an output terminal for generating a first push signal. The second AND gate 204 has a first input terminal connected to the first status module 112a for receiving the first de-queue signal, a second input terminal for receiving an inverted first buffer-empty signal by way of the second inverter 212, and an output terminal for generating a first pop signal.

The first buffer 206 is connected to the output terminals of the first and second AND gates 202 and 204 for receiving the first push and first pop signals, respectively. The first buffer 206 stores a first status value based on the first push signal, generates the first status signal based on the first status value and the first pop signal, and generates a first buffer-full signal when the first buffer 206 is full and a first buffer-empty signal when the first buffer 206 is empty. In an embodiment of the present invention, the first buffer 206 is a physical memory device. In one example, the first buffer 206 is a first-in-first-out (FIFO) buffer. The first buffer 206 stores a status value for every first push signal received and generates a status signal when pop signals are received. In another example, the first buffer 206 is a virtual data buffer. If the first interrupt is a periodic interrupt, the first buffer 206 stores multiple instances of the first interrupt.

The third AND gate 208 has a first input terminal connected to the first edge detector module 108a for receiving the first en-queue signal, a second input terminal connected to the first buffer 206 for receiving the first buffer-full signal, and an output terminal for generating a first error signal. The first error signal is indicative of a buffer overflow event. The buffer overflow event is triggered when the first buffer 206 is full and the first edge detector module 108a generates the first en-queue signal. Since the memory blocks of the first buffer 206 are completely occupied, the first error signal is transmitted to indicate that is the first buffer 206 is completely occupied, and hence, free memory is not available for storing the first status value. In one example, the first and second inverters 210 and 212 are implemented using NOT gates. In another example, the first and second inverters 210 are skewed inverters.

The second queue module 110b is connected between the second edge detector module 108b and the second status module 112b. The second queue module 110b receives and stores the second en-queue signal, receives a second de-queue signal, and generates a second status signal based on the second en-queue and second de-queue signals.

Figure 3:
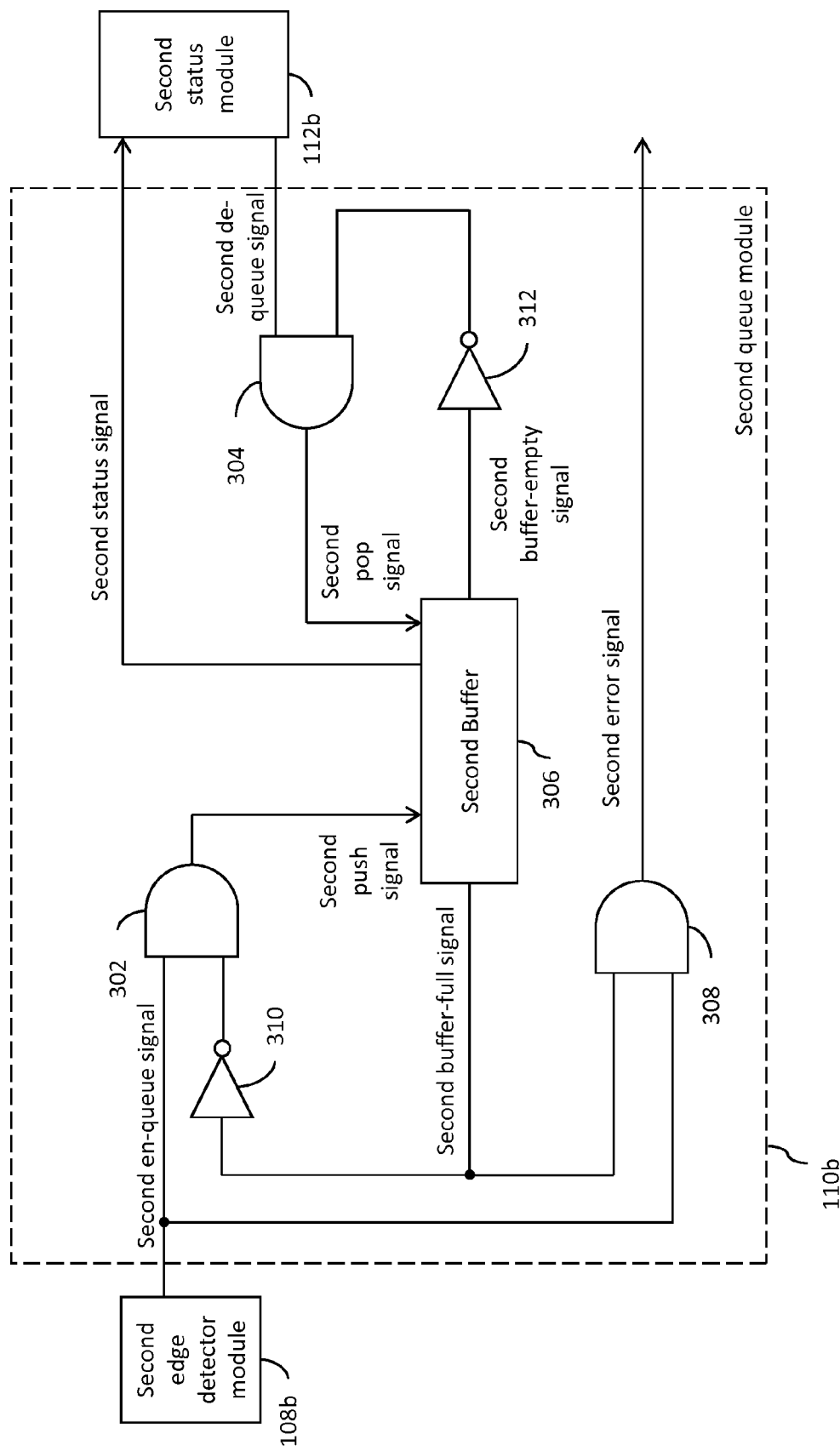
FIG. 3 is a schematic block diagram of a second queue module in accordance with an embodiment of the present invention.

Referring now to FIG. 3, a schematic block diagram of the second queue module 110b in accordance with an embodiment of the present invention is shown. The second queue module 110*b* includes a fourth AND gate 302, a fifth AND gate 304, a second buffer 306, a sixth AND gate 308, and third and fourth inverters 310 and 312.

The fourth AND gate 302 has a first input terminal connected to the second edge detector module 108*b* for receiving the second en-queue signal, a second input terminal for receiving an inverted second buffer-full signal by way of the third inverter 310, and an output terminal for generating a second push signal. The fifth AND gate 304 has a first input terminal connected to the second status module 112*b* for receiving the second de-queue signal, a second input terminal for receiving an inverted second buffer-empty signal by way of the fourth inverter 312, and an output terminal for generating a second pop signal.

The second buffer 306 is connected to the output terminals of the fourth and fifth AND gates 302 and 304 for receiving the second push and second pop signals, respectively. The second buffer 306 stores a second status value based on the second push signal, generates the second status signal based on the second status value and the second pop signal, and generates a second buffer-full signal when the second buffer 306 is full and a second buffer-empty signal when the second buffer 306 is empty.

The sixth AND gate 308 has a first input terminal connected to the second edge detector module 108*b* for receiving the second en-queue signal, a second input terminal connected to the second buffer 306 for receiving the second buffer-full signal, and an output terminal for generating a second error signal. The second error signal is functionally similar to the first error signal. The second buffer 306 is structurally and functionally similar to the first buffer 206. In one example, the third and fourth inverters 310 and 312 are implemented using NOT gates. In another example, the third and fourth inverters 310 and 312 are implemented using skewed inverters. In one example, the interrupts are periodic and generated frequently, the first and second queue modules 108*a* and 108*b* en-queue multiple instances of the first and second interrupts, respectively, and generate the first and second status signals based on the multiple instances of the first and second interrupts, respectively.

The first status module 112*a* is connected between the first queue module 110*a* and the first and second merger modules 114*a* and 114*b*. The first status module 112*a* receives the first and second output signals from the first and second merger modules 114*a* and 114*b*, respectively, identifies at least one of the first and second output signals as a first final output signal, and generates a first merge signal and the first de-queue signal based on the first final output signal and the first status signal.

Figure 4:
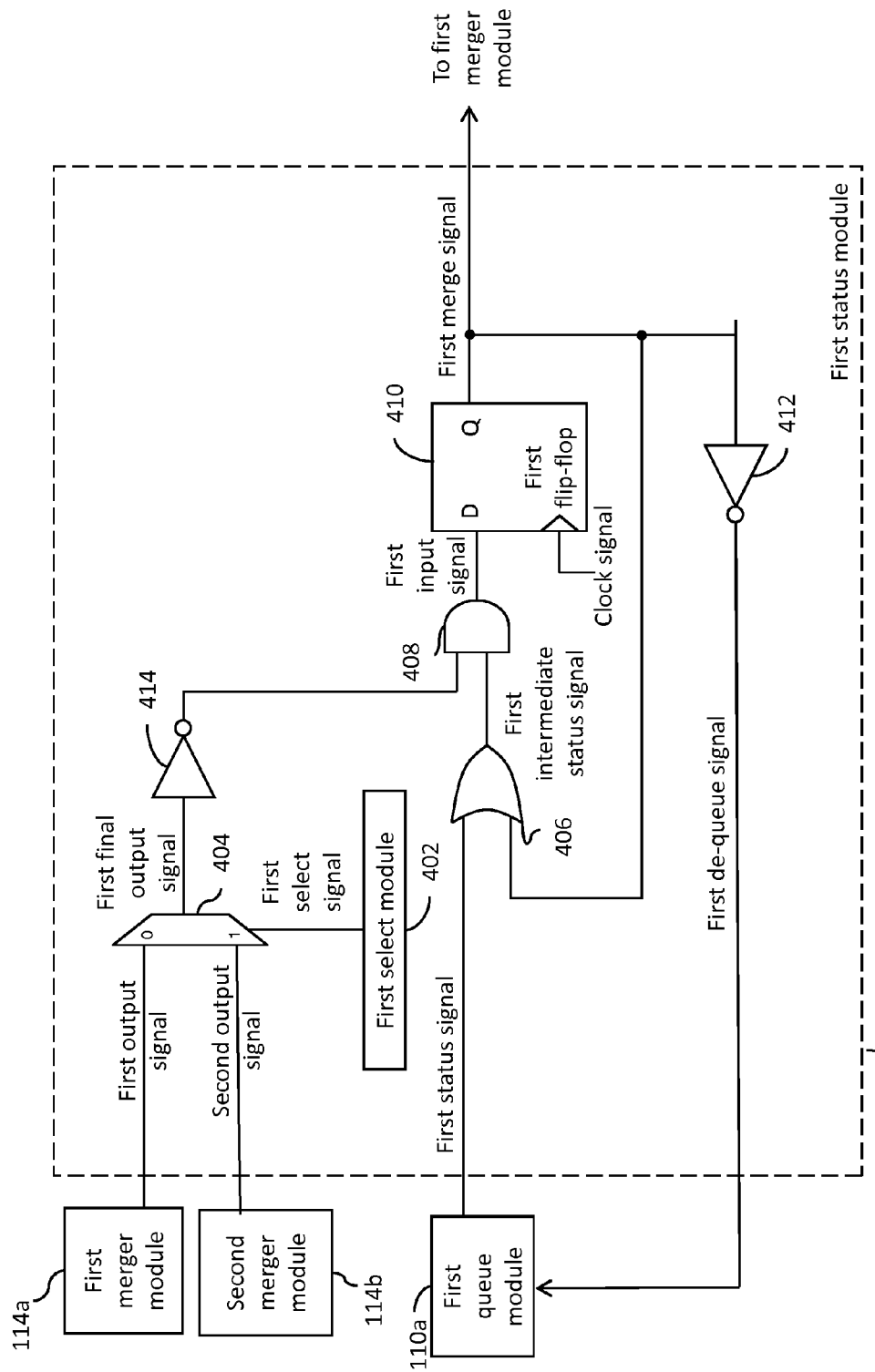
FIG. 4 is a schematic block diagram of a first status module in accordance with an embodiment of the present invention.

Referring to FIG. 4, a schematic block diagram of the first status module 112*a* in accordance with an embodiment of the present invention is shown. The first status module 112*a* includes a first select module 402, a first mux 404, a first OR gate 406, a seventh AND gate 408, a first flip-flop 410, a first NOT gate 412, and a fifth inverter 414.

The first select module 402 stores a first select value that identifies at least one of the first and second output signals and generates a first select signal based on the first select value. In one example, the first select module 402 is a storage register, i.e., a physical memory device that stores the first select value. In another example, the first select module 402 is a programmable register, and the first select value is programmed in to the first select module 402 by way of an external processor (not shown). In another example, the first select value indicates at least one of the first and second output signals that are formed by merging the first and the second interrupts.

The first mux 404 has a first input terminal connected to the first merger module 114*a* for receiving the first output signal, a second input terminal connected to the second merger module 114*b* for receiving the second output signal, a select terminal connected to the first select module 402 for receiving the first select signal, and an output terminal for outputting at least one of the first and second output signals as the first final output signal based on the first select signal. The first OR gate 406 has a first input terminal connected to the first queue module 110*a* for receiving the first status signal, a second input terminal for receiving the first merge signal, and an output terminal for generating a first intermediate status signal.

The seventh AND gate 408 has a first input terminal for receiving an inverted first final output signal by way of the fifth inverter 414, a second input terminal connected to the output terminal of the first OR gate 406 for receiving the first intermediate status signal, and an output terminal for generating a first input signal. In one example, the fifth inverter 414 is implemented using a NOT gate. In another example, the fifth inverter 414 is implemented using a skewed inverter.

The first flip-flop 410 has an input terminal connected to the output terminal of the seventh AND gate 408 for receiving the first input signal and an output terminal for generating the first merge signal. In one example, the first flip-flop 410 is a D-type edge-triggered flip-flop and operates based on a clock signal received at a clock input terminal thereof. In one embodiment of the present invention, the first flip-flop 410 outputs a delayed first input signal as the first merge signal. The first NOT gate 412 has an input terminal connected to the output terminal of the first flip-flop 410 for receiving the first merge signal and an output terminal for generating the first de-queue signal.

The second status module 112*b* is connected between the second queue module 110*b* and the first and second merger modules 114*a* and 114*b*. The second status module 112*b* receives the first and second output signals, identifies at least one of the first and second output signals as a second final output signal, and generates a second merge signal and the second de-queue signal based on the second final output signal and the second status signal.

Figure 5:
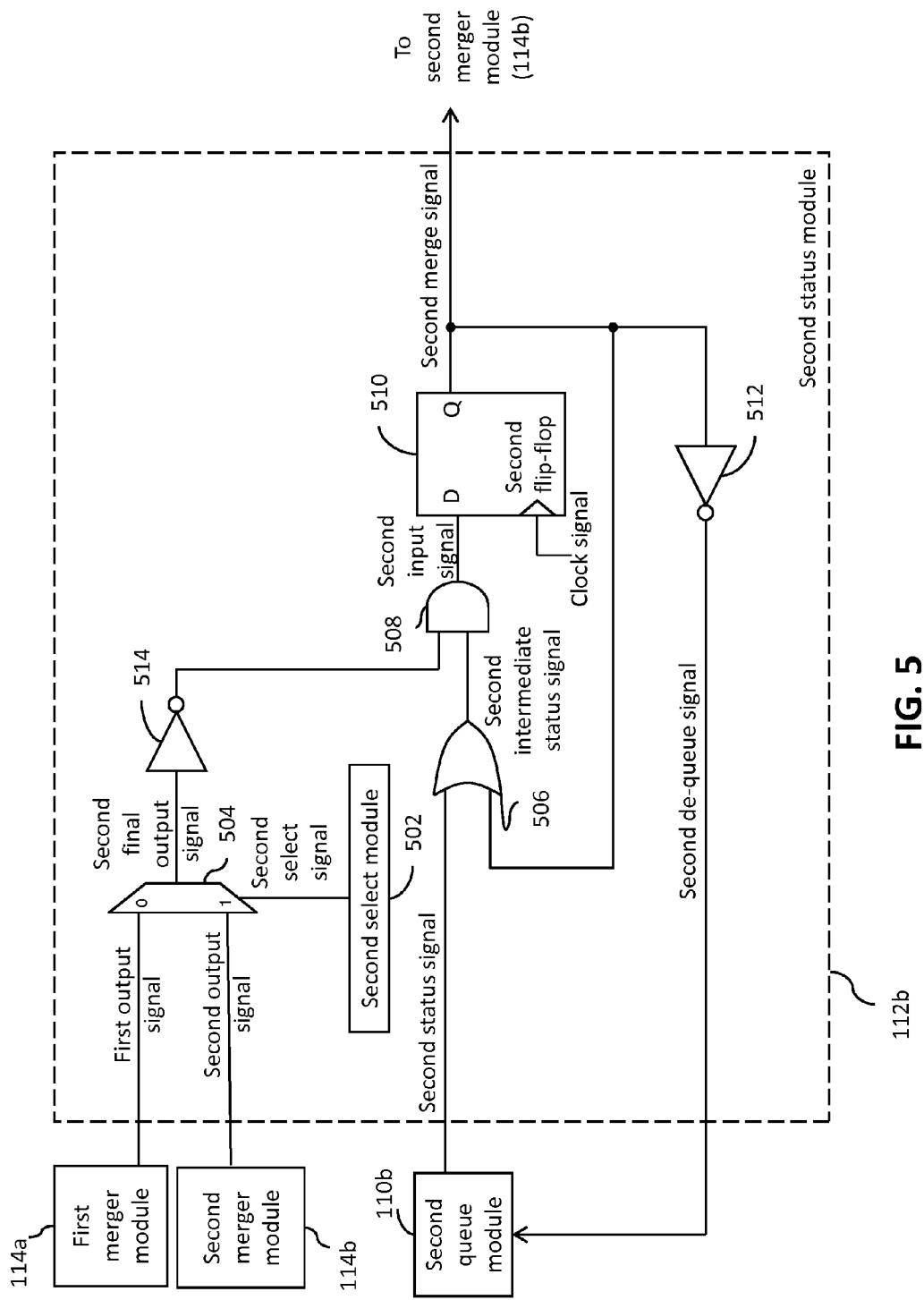
FIG. 5 is a schematic block diagram of a second status module in accordance with an embodiment of the present invention.

Referring to FIG. 5, a schematic block diagram of the second status module 112*b* in accordance with an embodiment of the present invention is shown. The second status module 112*b* includes a second select module 502, a second mux 504, a second OR gate 506, an eighth AND gate 508, a second flip-flop 510, a second NOT gate 512, and a sixth inverter 514.

The second select module 502 stores a second select value that identifies at least one of the first and second output signals and generates a second select signal based on the second select value.

The second mux 504 has a first input terminal connected to the first merger module 114*a* for receiving the first output signal, a second input terminal connected to the second merger module 114*b* for receiving the second output signal, a select terminal connected to the second select module 502 for receiving the second select signal, and an output terminal for outputting at least one of the first and second output signals as the second final output signal based on the second select signal. The second OR gate 506 has a first input terminal connected to the second queue module 110*b* for receiving the second status signal, a second input terminal for receiving the second merge signal, and an output terminal for generating a second intermediate status signal.

The eighth AND gate 508 has a first input terminal for receiving an inverted second final output signal by way of the sixth inverter 514, a second input terminal connected to the output terminal of the second OR gate 506 for receiving the second intermediate status signal, and an output terminal for generating a second input signal. In one example, the sixth inverter 514 is implemented using a NOT gate. In another example, the sixth inverter 514 is implemented using a skewed inverter.

The second flip-flop 510 has an input terminal connected to the output terminal of the eighth AND gate 508 for receiving the second input signal and an output terminal for generating the second merge signal. The second select module 502 and the second flip-flop 510 are structurally and functionally similar to the first select module 402 and the first flip-flop 410, respectively. The first and second status modules 112a and 112b determine whether the first and second interrupts are merged in to at least one of the first and second output signals, and generate the first and second de-queue signals, respectively, when the first and second interrupts are merged.

The first merger module 114a is connected to the first and second status modules 112a and 112b. The first merger module 114a receives the first and second merge signals, stores a first merger value that includes first and second values corresponding to the first and second interrupts, respectively, and generates the first output signal based on the first merger value and the first and second merge signals.

Figure 6:
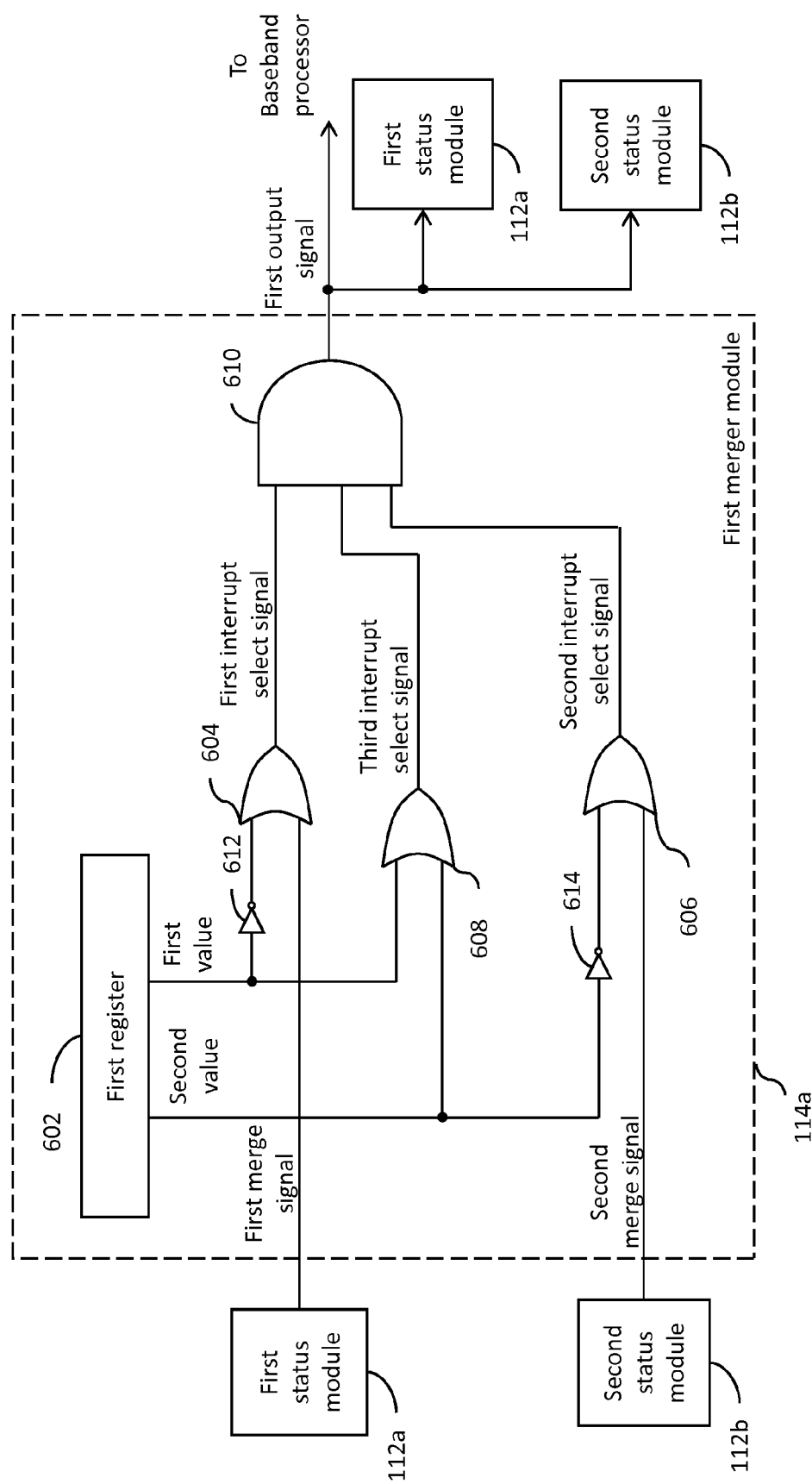
FIG. 6 is a schematic block diagram of a first merger module in accordance with an embodiment of the present invention.

Referring to FIG. 6, a schematic block diagram of the first merger module 114a in accordance with an embodiment of the present invention is shown. The first merger module 114a includes a first register 602, a third OR gate 604, a fourth OR gate 606, a fifth OR gate 608, a ninth AND gate 610, and seventh and eight inverters 612 and 614.

The first register 602 stores the first merger value that includes first and second values corresponding to the first and second interrupts, respectively. In one example, the first register 602 is a physical memory device that stores the first merger value. In another example, the first register 602 is a programmable register and the first value is programmed in to the first register 602. In another example, the first merger value includes a first bit corresponding to the first interrupt and a second bit corresponding to the second interrupt. If the first bit of the first merger value is true (e.g., at logic high state, the first interrupt is merged into the first output signal. Thus, the first value of the first merger value corresponds to the first bit of the first merger value. Similarly, if the second bit of the first merger value is true, the second interrupt is merged into the first output signal. Thus, the second value of the first merger value corresponds to the second bit of the first merger value. However, the first output signal is generated only when at least one of the first and second bits of the first merger value is true.

The third OR gate 604 has a first input terminal connected to the first status module 112a for receiving the first merge signal, a second input terminal connected to the first register 602 for receiving an inverted first value stored in the first register 602 by way of the seventh inverter 612, and an output terminal for generating a first interrupt select signal. The fourth OR gate 606 has a first input terminal connected to the second status module 112b for receiving the second merge signal, a second input terminal connected to the first register 602 for receiving an inverted second value stored in the first register 602 by way of the eighth inverter 614, and an output terminal for generating a second interrupt select signal. The fifth OR gate 608 has a first input terminal connected to the first register 602 for receiving the first value stored in the first register 602, a second input terminal connected to the first register 602 for receiving the second value stored in the first register 602, and an output terminal for generating a third interrupt select signal.

The ninth AND gate 610 has a first input terminal connected to the output terminal of the third OR gate 604 for receiving the first interrupt select signal, a second input terminal connected to the output terminal of the fourth OR gate 606 for receiving the second interrupt select signal, a third input terminal connected to the output terminal of the fifth OR gate 608 for receiving the third interrupt select signal, and an output terminal connected to the first and second status modules 112a and 112b for generating the first output signal.

The first output signal corresponds to the first interrupt if the first value stored in the first register 602 is true and corresponds to the second interrupt if the second value stored in the first register 602 is true. Hence, the first and second interrupts are merged into the first output signal when the first and second values stored in the first register 602 are true. In one embodiment, the seventh and eighth inverters 612 and 614 are implemented using NOT gates.

The second merger module 114b is connected to the first and second status modules 112a and 112b. The second merger module 114b receives the first and second merge signals, stores a second merger value that includes first and second values corresponding to the first and second interrupts, respectively, and generates the second output signal based on the second merger value and the first and second merge signals.

Figure 7:
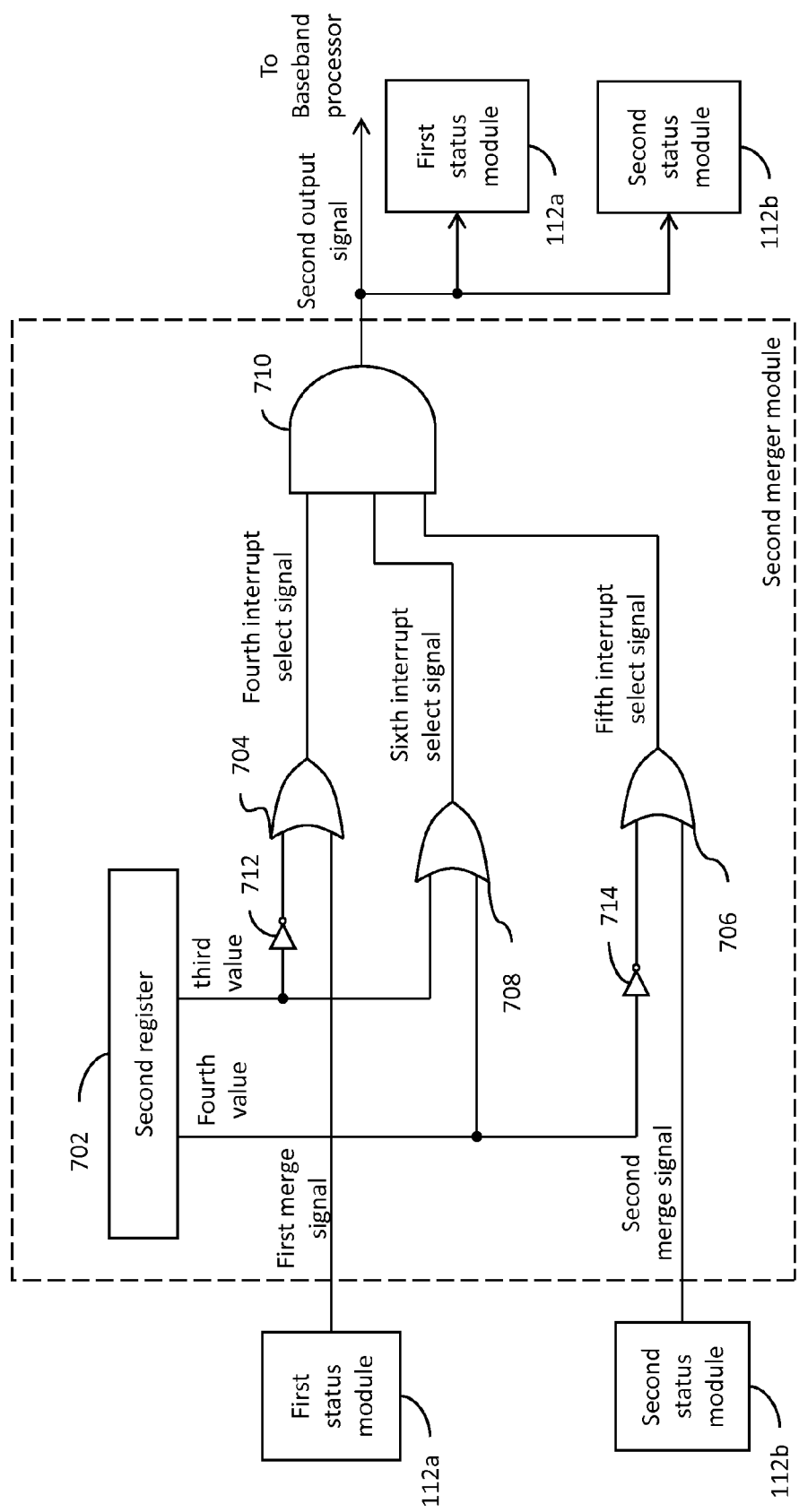
FIG. 7 is a schematic block diagram of a second merger module in accordance with an embodiment of the present invention.

FIG. 7 is a schematic block diagram of the second merger module 114b in accordance with an embodiment of the present invention. The second merger module 114b includes a second register 702, a sixth OR gate 704, a seventh OR gate 706, an eighth OR gate 708, a tenth AND gate 710, and ninth and tenth inverters 712 and 714.

The second register 702 stores the second merger value that includes third and fourth values corresponding to the first and second interrupts, respectively. The second register 702 is structurally and functionally similar to the first register 602. In another embodiment, the second merger value includes a first bit corresponding to the first interrupt and a second bit corresponding to the second interrupt. If the first bit of the second merger value is true, then the first interrupt is merged into the second output signal. Thus, the third value of the second merger value corresponds to the first bit of the second merger value. Similarly, if the second bit of the second merger value is true, the second interrupt is merged into the second output signal. Thus, the fourth value of the second merger value corresponds to the second bit of the second merger value. However, the second output signal is generated only when at least one of the first and second bits of the second merger value is true. The second merger value is similar to the first merger value.

The sixth OR gate 704 has a first input terminal connected to the first status module 112a for receiving the first merge signal, a second input terminal connected to the second register 702 for receiving an inverted version of the third value stored in the second register 702 by way of the ninth inverter 712, and an output terminal for generating a fourth interrupt select signal. The seventh OR gate 706 has a first input terminal connected to the second status module 112b for receiving the second merge signal, a second input terminal connected to the second register 702 for receiving an inverted version of the fourth value stored in the second register 702 by way of the tenth inverter 714, and an output terminal for generating a fifth interrupt select signal. The eighth OR gate 708 has a first input terminal connected to the second register 702 for receiving the third value stored in the second register 702, a second input terminal connected to the second register 702 for receiving the fourth value stored in the second register 702, and an output terminal for generating a sixth interrupt select signal.

The tenth AND gate 710 has a first input terminal connected to the output terminal of the sixth OR gate 704 for receiving the fourth interrupt select signal, a second input terminal connected to the output terminal of the seventh OR gate 706 for receiving the fifth interrupt select signal, a third input terminal connected to the output terminal of the eighth OR gate 708 for receiving the sixth interrupt select signal, and an output terminal connected to the first and second status modules 112a and 112b for generating the second output signal.

The second output signal corresponds to the first interrupt if the third value stored in the second register 702 is true and the second output signal corresponds to the second interrupt if the fourth value stored in the second register 702 is true. Hence, the first and second interrupts are merged into the second output signal when the third and fourth values stored in the second register 702 are true. In one example, the ninth and tenth inverters 712 and 714 are implemented using NOT gates. In another example, the ninth and tenth inverters 712 and 714 are implemented using skewed inverters. Thus, at least one of the first and second output signals is indicative of a merger of the first and second interrupts.

The baseband processor 105 is connected to the first and second merger modules 114a and 114b for receiving the first and second output signals. The baseband processor 105 further services the first and second output signals.

In operation, the first RFIC 103a receives the first RF signal and generates the first interrupt signal corresponding to the first interrupt. The second RFIC 103b receives the second RF signal and generates the second interrupt signal corresponding to the second interrupt. The first enable module 106a stores the first enable value, receives the first interrupt signal, determines whether the first interrupt is enabled or disabled based on the first enable value, and generates the first detect signal based on the first interrupt signal if the first interrupt is enabled. The first edge detector module 108a receives the first detect signal and generates the first en-queue signal based on one of the rising and falling edges of the first detect signal. The second enable module 106b stores the second enable value, receives the second interrupt signal, determines whether the second interrupt is enabled or disabled based on the second enable value, and generates the second detect signal based on the second interrupt signal if the second interrupt is enabled. The second edge detector module 108b receives the second detect signal and generates the second en-queue signal based on one of the rising and falling edges of the second detect signal.

The first queue module 110a receives and stores the first en-queue signal, receives the first de-queue signal, and generates the first status signal based on the first en-queue and first de-queue signals. The first status module 112a receives the first and second output signals and the first status signal, identifies at least one of the first and second output signals as the first final output signal, and generates the first merge signal and the first de-queue signal based on the first final output signal and the first status signal.

The second queue module 110b receives and stores the second en-queue signal, receives the second de-queue signal, and generates the second status signal based on the second en-queue and second de-queue signals. The second status module 112b receives the first and second output signals and the second status signal, identifies at least one of the first and second output signals as the second final output signal, and generates the second merge signal and the second de-queue signal based on the second final output signal and the second status signal.

The first merger module 114a receives the first and second merge signals, stores the first merger value, and generates the first output signal based on the first merger value and the first and second merge signals. The second merger module 114b receives the first and second merge signals, stores the second merger value, and generates the second output signal based on the second merger value and the first and second merge signals. Thus, at least one of the first and second output signals is indicative of the first and second interrupt signals, thereby merging the first and second interrupts into one of the first and second output signals.

The merging system 104 combines multiple interrupts into multiple output signals using hardware modules at each stage of processing. The baseband processor 105 receives the first and second output signals and then services the first and second output signals. Since the baseband processor 105 receives and services the output signals instead of servicing the interrupts individually, processing overhead of the baseband processor 105 is reduced. Therefore, the number of output signals received and serviced by the baseband processor 105 is less than the number of interrupts generated by the RFIC module 102, thereby reducing the processing overhead of the baseband processor 105 required for tracking and merging the interrupts. Hence, the performance of the baseband processor 105 is enhanced, which improves the throughput of the cellular communication network.

Further, the system 100 enables the baseband processor 105 to program the hardware modules, and hence, provides flexibility to control each stage of the multi-stage process for merging the interrupts. Since the merging system 104 includes queue modules for each interrupt, synchronization and merging of the periodic interrupts is achieved without increasing the software overhead. Further, each interrupt is merged only once in to any output signal, thereby preventing redundancy in the output signals. Hence, the performance penalty faced during the merger of the interrupts by the software is reduced by the use of the hardware modules. Therefore, the performance of the baseband processor 105 improves.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for merging first and second en-queue signals corresponding to first and second interrupts, respectively, comprising:
   a first queue module for receiving and storing the first en-queue signal, receiving a first de-queue signal, and generating a first status signal based on the first en-queue signal and the first de-queue signal;
   a first status module for receiving first and second output signals, and connected to the first queue module for receiving the first status signal, identifying one of the first and second output signals as a first final output signal, and generating a first merge signal and the first de-queue signal based on the first final output signal and the first status signal;

a second queue module for receiving and storing the second en-queue signal, receiving a second de-queue signal, and generating a second status signal based on the second en-queue signal and the second de-queue signal;

a second status module for receiving the first and second output signals, and connected to the second queue module for receiving the second status signal, identifying one of the first and second output signals as a second final output signal, and generating a second merge signal and the second de-queue signal based on the second final output signal and the second status signal;

a first merger module connected to the first and second status modules for receiving the first and second merge signals, respectively, storing a first merger value that includes first and second values corresponding to the first and second interrupts, respectively, and generating the first output signal based on the first merger value and the first and second merge signals; and a second merger module connected to the first and second status modules for receiving the first and second merge signals, respectively, storing a second merger value that includes third and fourth values corresponding to the first and second interrupts, respectively, and generating the second output signal based on the second merger value and the first and second merge signals, wherein at least one of the first and second output signals is indicative of the first and second en-queue signals, thereby merging the first and second en-queue signals into the at least one of the first and second output signals.

2. The system of claim 1, further comprising:
a radio-frequency integrated circuit (RFIC) module for receiving first and second radio-frequency (RF) signals and generating first and second interrupt signals corresponding to the first and second interrupts, respectively; and
a baseband processor connected to the first and second merger modules for receiving and servicing the first and second output signals.

3. The system of claim 2, further comprising:
a first enable module connected to the RFIC module for receiving the first interrupt signal, storing a first enable value indicative of one of enable and disable status of the first interrupt, determining whether the first interrupt is enabled or disabled based on the first enable value, and generating a first detect signal based on the first interrupt signal if the first interrupt is enabled;
a first edge detector module, connected between the first enable module and the first queue module, for receiving the first detect signal from the first enable module and generating the first en-queue signal based on at least one of a rising and a falling of the first detect signal;
a second enable module connected to the RFIC module for receiving the second interrupt signal, storing a second enable value indicative of one of enable and disable status of the second interrupt, determining whether the second interrupt is enabled or disabled based on the second enable value, and generating a second detect signal based on the second interrupt signal if the second interrupt is enabled; and
a second edge detector module, connected between the second enable module and the second queue module, for receiving the second detect signal and generating the second en-queue signal based on one of a rising and a falling edge of the second detect signal.

4. The system of claim 1, wherein the first queue module comprises:
a first AND gate having a first input terminal connected to the first edge detector module for receiving the first en-queue signal, a second input terminal for receiving an inverted first buffer-full signal, and an output terminal for generating a first push signal;
a second AND gate having a first input terminal connected to the first status module for receiving the first de-queue signal, a second input terminal for receiving an inverted first buffer-empty signal, and an output terminal for generating a first pop signal;
a first buffer connected to the output terminals of the first and second AND gates for receiving the first push signal and the first pop signal, respectively, storing a first status value based on the first push signal, generating the first status signal based on the first status value and the first pop signal, generating a first buffer-full signal when the first buffer is full, and generating a first buffer-empty signal when the first buffer is empty; and
a third AND gate having a first input terminal connected to the first edge detector module for receiving the first en-queue signal, a second input terminal connected to the first buffer for receiving the first buffer-full signal, and an output terminal for generating a first error signal.

5. The system of claim 4, wherein the second queue module comprises:
a fourth AND gate having a first input terminal connected to the second edge detector module for receiving the second en-queue signal, a second input terminal for receiving an inverted second buffer-full signal, and an output terminal for generating a second push signal;
a fifth AND gate having a first input terminal connected to the second status module for receiving the second de-queue signal, a second input terminal for receiving an inverted second buffer-empty signal, and an output terminal for generating a second pop signal;
a second buffer connected to the output terminals of the fourth and fifth AND gates for receiving the second push signal and the second pop signal, respectively, storing a second status value based on the second push signal, generating the second status signal based on the second status value and the second pop signal, generating a second buffer-full signal when the second buffer is full, and generating a second buffer-empty signal when the second buffer is empty; and
a sixth AND gate having a first input terminal connected to the second edge detector module for receiving the second en-queue signal, a second input terminal connected to the second buffer for receiving the second buffer-full signal, and an output terminal for generating a second error signal.

6. The system of claim 5, wherein the first status module comprises:
a first select module for storing a first select value indicative of one of the first and second output signals, and generating a first select signal based on the first select value;
a first multiplexer having a first input terminal connected to the first merger module for receiving the first output signal, a second input terminal connected to the second merger module for receiving the second output signal, a select terminal connected to the first select module for receiving the first select signal, and an output terminal for outputting one of the first and second output signals as the first final output signal based on the first select signal;

a first OR gate having a first input terminal connected to the first queue module for receiving the first status signal, a second input terminal for receiving the first merge signal, and an output terminal for generating a first intermediate status signal;

a seventh AND gate having a first input terminal for receiving an inverted version of the first final output signal, a second input terminal connected to the output terminal of the first OR gate for receiving the first intermediate status signal, and an output terminal for generating a first input signal;

a first flip-flop having an input terminal connected to the output terminal of the seventh AND gate for receiving the first input signal, and an output terminal for generating the first merge signal; and a first NOT gate having an input terminal connected to the output terminal of the first flip-flop for receiving the first merge signal, and an output terminal for generating the first de-queue signal.

7. The system of claim 6, wherein the second status module comprises:

a second select module for storing a second select value indicative of one of the first and second output signals, and generating a second select signal based on the second select value;

a second multiplexer having a first input terminal connected to the first merger module for receiving the first output signal, a second input terminal connected to the second merger module for receiving the second output signal, a select terminal connected to the second select module for receiving the second select signal, and an output terminal for outputting one of the first and second output signals as the second final output signal based on the second select signal;

a second OR gate having a first input terminal connected to the second queue module for receiving the second status signal, a second input terminal for receiving the second merge signal, and an output terminal for generating a second intermediate status signal;

an eighth AND gate having a first input terminal for receiving an inverted version of the second final output signal, a second input terminal connected to the output terminal of the second OR gate for receiving the second intermediate status signal, and an output terminal for generating a second input signal;

a second flip-flop having an input terminal connected to the output terminal of the eighth AND gate for receiving the second input signal, and an output terminal for generating the second merge signal; and a second NOT gate having an input terminal connected to the output terminal of the second flip-flop for receiving the second merge signal, and an output terminal for generating the second de-queue signal.

8. The system of claim 7, wherein the first merger module comprises:

a first register for storing the first merger value;

a third OR gate having a first input terminal connected to the first status module for receiving the first merge signal, a second input terminal connected to the first register for receiving an inverted version of the first value stored in the first register, and an output terminal for generating a first interrupt select signal;

a fourth OR gate having a first input terminal connected to the second status module for receiving the second merge signal, a second input terminal connected to the first register for receiving an inverted version of the second value stored in the first register, and an output terminal for generating a second interrupt select signal;

a fifth OR gate having a first input terminal connected to the first register for receiving the first value, a second input terminal connected to the first register for receiving the second value, and an output terminal for generating a third interrupt select signal; and a ninth AND gate having a first input terminal connected to the output terminal of the third OR gate for receiving the first interrupt select signal, a second input terminal connected to the output terminal of the fourth OR gate for receiving the second interrupt select signal, a third input terminal connected to the output terminal of the fifth OR gate for receiving the third interrupt select signal, and an output terminal connected to the first and second status modules for generating the first output signal.

9. The system of claim 8, wherein the first output signal corresponds to the first interrupt if the first value stored in the first register is true, and wherein the first output signal corresponds to the second interrupt if the second value stored in the first register is at true, wherein the first and second interrupts are merged when the first and second values stored in the first register are both true.

10. The system of claim 8, wherein the second merger module comprises:

a second register for storing the second merger value;

a sixth OR gate having a first input terminal connected to the first status module for receiving the first merge signal, a second input terminal connected to the second register for receiving an inverted version of the third value stored in the second register, and an output terminal for generating a fourth interrupt select signal;

a seventh OR gate having a first input terminal connected to the second status module for receiving the second merge signal, a second input terminal connected to the second register for receiving an inverted version of the fourth value stored in the second register, and an output terminal for generating a fifth interrupt select signal;

a eighth OR gate having a first input terminal connected to the second register for receiving the third value stored in the second register, a second input terminal connected to the second register for receiving the fourth value stored in the second register, and an output terminal for generating a sixth interrupt select signal; and a tenth AND gate having a first input terminal connected to the output terminal of the sixth OR gate for receiving the fourth interrupt select signal, a second input terminal connected to the output terminal of the seventh OR gate for receiving the fifth interrupt select signal, a third input terminal connected to the output terminal of the eighth OR gate for receiving the sixth interrupt select signal, and an output terminal connected to the first and second status modules for generating the second output signal.

11. The system of claim 10, wherein the second output signal corresponds to the first interrupt if the third value stored in the second register is true, and wherein the second output signal corresponds to the second interrupt if the fourth value stored in the second register is true, wherein the first and second interrupts are merged when the third and fourth values stored in the second register are both true.

12. A wireless communication system, comprising:
a radio-frequency integrated circuit (RFIC) module for receiving first and second radio-frequency (RF) signals and generating first and second interrupt signals corresponding to first and second interrupts, respectively;
a first enable module connected to the RFIC module for receiving the first interrupt signal, for storing a first enable value indicative of at least one of enable and disable status of the first interrupt, determining whether the first interrupt is enabled or disabled based on the first enable value, and generating a first detect signal based on the first interrupt signal if the first interrupt is enabled;
a first edge detector module connected to the first enable module for receiving the first detect signal and generating a first en-queue signal based on at least one of rising and falling edges of the first detect signal;
a second enable module connected to the RFIC module for receiving the second interrupt signal, for storing a second enable value indicative of at least one of enable and disable status of the second interrupt, determining whether the second interrupt is enabled or disabled based on the second enable value, and generating a second detect signal based on the second interrupt signal if the second interrupt is enabled;
a second edge detector module connected to the second enable module for receiving the second detect signal and generating a second en-queue signal based on at least one of rising and falling edges of the second detect signal;
a first queue module connected to the first edge detector module for receiving and storing the first en-queue signal, receiving a first de-queue signal, and generating a first status signal based on the first en-queue and first de-queue signals;
a first status module for receiving first and second output signals and connected to the first queue module for receiving the first status signal, identifying at least one of the first and second output signals as a first final output signal, and generating a first merge signal and the first de-queue signal based on the first final output signal and the first status signal;
a second queue module for receiving and storing the second en-queue signal, receiving a second de-queue signal, and generating a second status signal based on the second en-queue and second de-queue signals;
a second status module for receiving the first and second output signals and connected to the second queue module for receiving the second status signal, identifying at least one of the first and second output signals as a second final output signal, and generating a second merge signal and the second de-queue signal based on the second final output signal;
a first merger module connected to the first and second status modules for receiving the first and second merge signals, respectively, for storing a first merger value that includes first and second values corresponding to the first and second interrupts, respectively, and generating the first output signal based on the first merger value and the first and second merge signals;
a second merger module connected to the first and second status modules for receiving the first and second merge signals, respectively, for storing a second merger value that includes first and second values corresponding to the first and second interrupts, respectively, and generating the second output signal based on the second merger value and the first and second merge signals, wherein at least one of the first and second output signals are indicative of the first and second interrupt signals, thereby merging the first and second interrupts in to at least one of the first and second output signals; and
a baseband processor connected to the first and second merger modules for receiving and servicing the first and second output signals.

13. The wireless communication system of claim 12, wherein the first queue module comprises:
a first AND gate having a first input terminal connected to the first edge detector module for receiving the first en-queue signal, a second input terminal for receiving an inverted first buffer-full signal, and an output terminal for generating a first push signal;
a second AND gate having a first input terminal connected to the first status module for receiving the first de-queue signal, a second input terminal for receiving an inverted first buffer-empty signal, and an output terminal for generating a first pop signal;
a first buffer connected to the output terminals of the first and second AND gates for receiving the first push and first pop signals, respectively, storing a first status value based on the first push signal, generating the first status signal based on the first status value and the first pop signal, and generating a first buffer-full signal when the first buffer is full and a first buffer-empty signal when the first buffer is empty; and
a third AND gate having a first input terminal connected to the first edge detector module for receiving the first en-queue signal, a second input terminal connected to the first buffer for receiving the first buffer-full signal, and an output terminal for generating a first error signal.

14. The wireless communication system of claim 13, wherein the second queue module comprises:
a fourth AND gate having a first input terminal connected to the second edge detector module for receiving the second en-queue signal, a second input terminal for receiving an inverted second buffer-full signal, and an output terminal for generating a second push signal;
a fifth AND gate having a first input terminal connected to the second status module for receiving the second de-queue signal, a second input terminal for receiving an inverted second buffer-empty signal, and an output terminal for generating a second pop signal;
a first buffer connected to the output terminals of the fourth and the fifth AND gates for receiving the second push and second pop signals respectively, storing a second status value based on the second push signal, generating the second status signal based on the second status value and the second pop signal, and generating a second buffer-full signal when the second buffer is full and a second buffer-empty signal when the second buffer is empty; and
a sixth AND gate having a first input terminal connected to the second edge detector module for receiving the second en-queue signal, a second input terminal connected to the second buffer for receiving the second buffer-full signal, and an output terminal for generating a second error signal.

15. The wireless communication system of claim 14, wherein the first status module comprises:
a first select module for storing a first select value indicative of at least one of the first and second output signals and generating a first select signal based on the first select value;

a first multiplexer having a first input terminal connected to the first merger module for receiving the first output signal, a second input terminal connected to the second merger module for receiving the second output signal, a select terminal connected to the first select module for receiving the first select signal, and an output terminal for outputting at least one of the first and second output signals as the first final output signal based on the first select signal;

a first OR gate having a first input terminal connected to the first queue module for receiving the first status signal, a second input terminal for receiving the first merge signal, and an output terminal for generating a first intermediate status signal;

a seventh AND gate having a first input terminal for receiving an inverted first final output signal, a second input terminal connected to the output terminal of the first OR gate for receiving the first intermediate status signal, and an output terminal for generating a first input signal;

a first flip-flop having an input terminal connected to the output terminal of the seventh AND gate for receiving the first input signal and an output terminal for generating the first merge signal; and a first NOT gate having an input terminal connected to the output terminal of the first flip-flop for receiving the first merge signal and an output terminal for generating the first de-queue signal.

16. The wireless communication system of claim 15, wherein the second status module comprises:

a second select module for storing a second select value indicative of at least one of the first and second output signals and generating a second select signal based on the second select value;

a second multiplexer having a first input terminal connected to the first merger module for receiving the first output signal, a second input terminal connected to the second merger module for receiving the second output signal, a select terminal connected to the second select module for receiving the second select signal, and an output terminal for outputting at least one of the first and second output signals as the second final output signal based on the second select signal;

a second OR gate having a first input terminal connected to the second queue module for receiving the second status signal, a second input terminal for receiving the second merge signal, and an output terminal for generating a second intermediate status signal;

a eighth AND gate having a first input terminal for receiving an inverted second final output signal, a second input terminal connected to the output terminal of the second OR gate for receiving the second intermediate status signal, and an output terminal for generating a second input signal;

a second flip-flop having an input terminal connected to the output terminal of the eighth AND gate for receiving the second input signal and an output terminal for generating the second merge signal; and a second NOT gate having an input terminal connected to the output terminal of the second flip-flop for receiving the second merge signal and an output terminal for generating the second de-queue signal.

17. The wireless communication system of claim 16, wherein the first merger module comprises:

a first register for storing the first merger value;

a third OR gate having a first input terminal connected to the first status module for receiving the first merge signal, a second input terminal connected to the first register for receiving an inverted first value stored in the first register, and an output terminal for generating a first interrupt select signal;

a fourth OR gate having a first input terminal connected to the second status module for receiving the second merge signal, a second input terminal connected to the first register for receiving an inverted second value stored in the first register, and an output terminal for generating a second interrupt select signal;

a fifth OR gate having a first input terminal connected to the first register for receiving the first value stored in the first register, a second input terminal connected to the first register for receiving the second value stored in the first register, and an output terminal for generating a third interrupt select signal; and a ninth AND gate having a first input terminal connected to the output terminal of the third OR gate for receiving the first interrupt select signal, a second input terminal connected to the output terminal of the fourth OR gate for receiving the second interrupt select signal, a third input terminal connected to the output terminal of the fifth OR gate for receiving the third interrupt select signal, and an output terminal connected to the first and second status modules for generating the first output signal.

18. The wireless communication system of claim 17, wherein the first output signal corresponds to the first interrupt if the first value stored in the first register is at logic high state, and wherein the first output signal corresponds to the second interrupt if the second value stored in the first register is at logic high state, whereby the first and second interrupts are merged when the first and second values stored in the first register are at logic high states.

19. The wireless communication system of claim 18, wherein the second merger module comprises:

a second register for storing the second merger value;

a sixth OR gate having a first input terminal connected to the first status module for receiving the first merge signal, a second input terminal connected to the second register for receiving an inverted first value stored in the second register, and an output terminal for generating a fourth interrupt select signal;

a seventh OR gate having a first input terminal connected to the second status module for receiving the second merge signal, a second input terminal connected to the second register for receiving an inverted second value stored in the second register, and an output terminal for generating a fifth interrupt select signal;

an eighth OR gate having a first input terminal connected to the second register for receiving the first value stored in the second register, a second input terminal connected to the second register for receiving the second value stored in the second register, and an output terminal for generating a sixth interrupt select signal; and a tenth AND gate having a first input terminal connected to the output terminal of the sixth OR gate for receiving the fourth interrupt select signal, a second input terminal connected to the output terminal of the seventh OR gate for receiving the fifth interrupt select signal, a third input terminal connected to the output terminal of the eighth OR gate for receiving the sixth interrupt select signal, and an output terminal connected to the first and second status modules for generating the second output signal.

20. The wireless communication system of claim 19, wherein the second output signal corresponds to the first interrupt if the first value stored in the second register is at logic high state, and wherein the second output signal corresponds to the second interrupt if the second value stored in the second register is at logic high state, whereby the first and second interrupts are merged when the first and second values stored in the second register are at logic high states.

* * * * *